United States Patent [19]
West et al.

[11] Patent Number: 5,874,967
[45] Date of Patent: Feb. 23, 1999

[54] GRAPHICS SYSTEM AND PROCESS FOR BLENDING GRAPHICS DISPLAY LAYERS

[75] Inventors: R. Michael P. West, Colchester; Edward K. Evans, Essex Junction; Stephen J. Stratz, Shelburne, all of Vt.

[73] Assignee: International Business Machines Corporation, Armonk, N.Y.

[21] Appl. No.: 931,926

[22] Filed: Sep. 17, 1997

Related U.S. Application Data

[63] Continuation of Ser. No. 466,569, Jun. 6, 1995, abandoned.
[51] Int. Cl.$^6$ .................................................. G06T 3/00
[52] U.S. Cl. ........................ 345/435; 345/113; 345/114
[58] Field of Search .................................. 345/113, 114, 345/153, 433, 435, 431, 432, 340, 342, 343, 344, 345

[56] References Cited

U.S. PATENT DOCUMENTS

| | | | |
|---|---|---|---|
| 5,227,863 | 7/1993 | Bilbrey et al. | 358/22 |
| 5,243,332 | 9/1993 | Jacobson | 345/44 |
| 5,243,447 | 9/1993 | Bodenkamp et al. | 345/133 |
| 5,250,933 | 10/1993 | Beaudin et al. | 345/115 |
| 5,251,298 | 10/1993 | Nally | 395/166 |
| 5,264,837 | 11/1993 | Buehler | 345/115 |
| 5,270,688 | 12/1993 | Dawson et al. | 345/150 |
| 5,271,097 | 12/1993 | Barker et al. | 345/435 |
| 5,287,096 | 2/1994 | Thompson et al. | 345/147 |
| 5,291,187 | 3/1994 | Wood et al. | 345/185 |
| 5,332,968 | 7/1994 | Brown | 324/309 |
| 5,361,081 | 11/1994 | Barnaby | 345/145 |
| 5,367,318 | 11/1994 | Beaudin et al. | 345/201 |
| 5,379,129 | 1/1995 | Othmer et al. | 358/450 |
| 5,444,835 | 8/1995 | Turkowski | 395/135 |
| 5,638,501 | 6/1997 | Gough et al. | 345/435 |
| 5,651,107 | 7/1997 | Frank et al. | 345/344 |

*Primary Examiner*—Stephen S. Hong
*Attorney, Agent, or Firm*—DeLio & Peterson, LLC; Peter W. Peterson; Tiffany L. Townsend

[57] ABSTRACT

A graphics system comprising a format processor for receiving display data including pixel data and color-blending information for at least two (2) separate display layers, a color blender and color processors. The pixel data includes color information for the display layers. The color-blending information determines weighting factors for use in blending the colors of the display layers. The format processor outputs separate streams of pixel data, one for each display layer, as well as the weighting factors. Each stream of pixel data outputted by the processor is inputted into a corresponding color processor that assigns colors to a particular display layer according to the color information in the corresponding pixel data. The color blender blends the colors assigned to the display layers according to the weighting factors.

10 Claims, 2 Drawing Sheets

GRAPHICS SYSTEM AND PROCESS FOR BLENDING GRAPHICS DISPLAY LAYERS

This is a continuation of copending application(s) Ser. No. 08/466,569 filed on Jun. 6, 1995, now abandoned.

BACKGROUND OF THE INVENTION

1. Field of the Invention

The present invention pertains to computer graphics systems.

2. Problem to be Solved

In many computer graphic systems, such as Graphical User Interfaces (GUI), Computer Aided Design (CAD), Computer Aided Engineering (CAE) or Image Processing, multiple layers of display information are used. In particular, there is a main application layer or window and at least one overlay layer or window. Display information is presented in layers or windows defined by software. The overlay layer may be used to provide on-screen selection from a number of control options pertaining to the underlying main application layer. Common uses of overlay layers or windows include "Pop-Down Menus", "Help Menus", Control Panels and other data for providing information and control functions.

A computer graphics system generally comprises a Graphics Controller, Graphics Memory, and a Palette DAC. (The Palette DAC is sometimes referred to by such names as "RAMDAC" or as "LUT-DAC" or incorrectly as simply "DAC".) The computer graphics system is connected to the rest of the computer system over the System Bus. The Graphics Controller provides the interface of the computer graphics system to the System Bus. The Graphics Memory is loaded with graphics data supplied by or via the Graphics Controller. The graphics data stored in the Graphics Memory is provided to the Palette DAC, which processes and converts that graphics data, providing the results of that processing and conversion to the Display Device for presentation as a visual image.

The input to the Palette DAC typically comprises a serializer, which receives graphics data serially from the Graphics Memory. That data is typically several pixels wide and provided at a frequency that is some fraction of the display pixel frequency. The output of the serializer is typically one (1) pixel wide at full pixel frequency. The pixel frequency may be as high as 250 MHz and, in some special cases, much higher than 250 MHz. The output of the serializer is continuous and in synchronism with the Display Device. The output of the serializer satisfies the real time data needs of the Display Device. The output of the serializer typically contains at least two types of data: a Window Identifier (WID), and the pixel data for at least two display layers. The display layers will at least consist of a main display layer and an overlay display layer.

The WID is a pointer used to locate window attributes from a Window Attribute Table (WAT). The attributes are typically loaded into the WAT by software. The attributes define the format of the pixel data, the presence and number of display layers associated with that pixel data, how that pixel data is to be partitioned between the display layers, the type of processing to be applied to the pixel data of each display layer, and the criteria for the decision of which of the layers is to be displayed. The criteria for that decision may be based on a selection made directly within the attributes or be made dependent on the value of the pixel data (pixel-based criterion) within any given display layer. In all cases, at any given pixel location, only pixel data from the selected layer is displayed, and pixel data from all other layers will not be displayed and will be effectively obscured from view.

The pixel data outputted from the serializer is inputted into a processor which separates and formats the pixel data according to the window or pixel attributes stored in the WAT. As stated above, the window or pixel attributes determine which portions of the pixel data are to be associated with each display layer. After separation and formatting, an original color is assigned to the pixel location of each layer. The color assignment process can take any one of a number of forms including the use of Color Look-Up Tables, Direct Color Bypass, Algorithmic Conversion, or Color Space Conversion.

Typically, there are many pixel locations where an overlay layer and an underlying layer interact, i.e. the overlay layer and the underlying layer are defined by the same pixel locations. Since only one color value can be displayed at any one pixel location on the display screen, a multiplexer selects a color value of a pixel location from either the underlying layer or the overlaying layer. The multiplexer output is then inputted into a three (3) channel digital-to-analog-converter which converts the digital signal representing the selected color into three (3) analog signals representing the primary colors red, green and blue for use with a display device.

Thus, graphical information from either the underlying layer or the overlay layer is displayed on the display device. If the graphical information is selected from the underlying layer, then the overlay layer is said to be "transparent". If the graphical information is selected from the overlay layer, then the overlay layer is said to be "opaque". The overlay layers are typically rectangular in shape and are formed from solid colors. When an overlay layer is displayed over an underlying layer, the solid colors assigned to the pixel locations of the overlay layer are used to replace (on a per-pixel basis) the assigned colors to the pixel locations of the underlying layer. Thus, the solid colors of the overlay layer obstruct the user's view of the underlying layer. Typically, the underlying layer is often a main application display layer or window. Furthermore, the overlay layer or window often obstructs the main application window at the precise area to which the information provided by the overlay layer pertains. This feature has undesirable side-effects which cause inconvenience to the user, and also provide an uncomfortable aspect and feel to the user interface. Such negative aspects ultimately result in a reduction in user acceptance of the graphics system and degradation in productivity.

Thus, bearing in mind the aforementioned problem of conventional graphics systems, it is an object of the present invention to provide a graphics system that provides a user with a clear and unobstructed view to the graphic information provided by all the display layers.

It is another object of the present invention to provide a process for displaying at least two (2) display layers wherein the user is provided with a clear and unobstructed view to the information provided by both overlay and underlying display layers.

SUMMARY OF THE INVENTION

The above and other objects and advantages, which will be apparent to one of skill in the art, are achieved in the present invention which is directed to, in a first aspect, a graphics system comprising a format processor for receiving and separating pixel data for at least two (2) separate display layers, color processors and a color blender. The pixel data includes color and color-blending information for the display layers wherein the blending information determines weighting factors for use in blending the colors of the display layers. The format processor outputs a stream of pixel data for each display layer. Each stream of pixel data is processed by a color processor. Each color processor assigns colors to a particular display layer according to the color information in the corresponding pixel data. The color blender blends the colors assigned to the display layers according to the weighting factors.

In a related aspect, the present invention is directed to a graphics system, comprising a format processor for receiving and separating pixel data for at least two (2) separate display layers, color processors and a color blender. The pixel data includes color and color-blending information for the separate display layers. The blending information determines weighting factors for use in blending the colors of the display layers. The format processors outputs a stream of pixel data for each display layer. The graphics system also includes a storage device for storing the weighting factors. Each stream of pixel data is inputted into a corresponding color processor that assigns colors to a particular display layer according to the color information in the corresponding pixel data. The graphics system further includes a color-blender control responsive to the color blending information. The color blender control outputs control signals that indicate whether the colors of the display layers are to be blended and the weighting factors to be used in any such blending. The color blender blends the colors assigned to the display layers according to the weighting factors. The color blender includes a controller responsive to the control signal for enabling the color blender to blend the colors of the display layers.

In a further aspect, the present invention is directed to a process for displaying graphic display layers, comprising the steps of (a) providing pixel data for at least two (2) display layers wherein the pixel data includes color and color-blending information for the display layers, the blending information determining weighting factors, (b) separating the pixel data into separate display layers, (c) assigning colors to each of the display layers according to the color information in the pixel data, and (d) blending the colors assigned to the display layers according to the weighting factors.

In another aspect, the present invention is directed to a device for displaying interacting graphical information on a display device, comprising a serializer, a format processor, color processors and a color blender. The serializer receives serial pixel data for at least two (2) display layers. The serial pixel data has a first pixel width and a first pixel data rate. The serializer converts the serial pixel data into serial pixel data having a second pixel width and a second pixel data rate. The format processor receives, formats and separates the converted serial pixel data. The format processor then outputs a stream of pixel data for each display layer. The pixel data outputted by the format processor includes color and color-blending information for the display layers. The blending information determines weighting factors to be used in blending the colors of the display layers. Each stream of pixel data is inputted into a corresponding color processor that assigns colors to the display layer according to the color information in the pixel data. The device further includes a color-blender control responsive to the color blending information. The color-blender control outputs control signals that indicate whether the colors of the display layers are to be blended and the weighting factors to be used in any such blending. The color blender has a controller responsive to the control signal for enabling the color blender to blend the colors of the display layers. When enabled by the controller, the color blender blends the colors assigned to the display layers according to the weighting factors to produce a predetermined color that is the weighted average of the colors of the display layers. The device further includes means for converting the predetermined color produced by the color blender into signals representing primary colors used with the display device. The device includes a storage device for storing the weighting factors.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENTS

Figure 1:
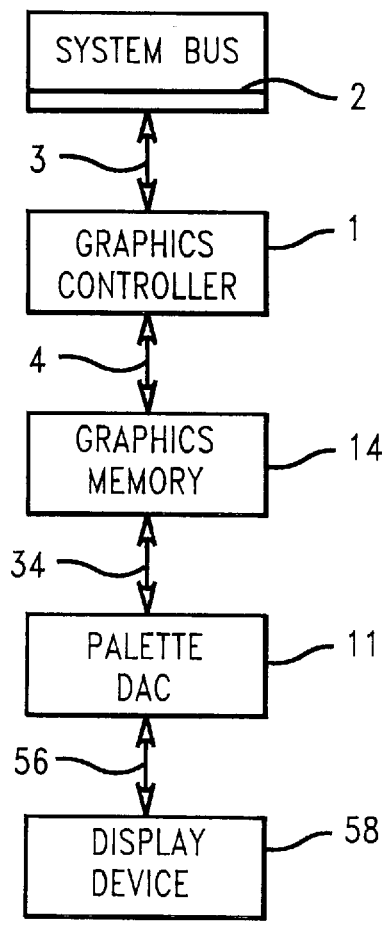
FIG. 1 is a block diagram of a computer graphics system.
Figure 2:
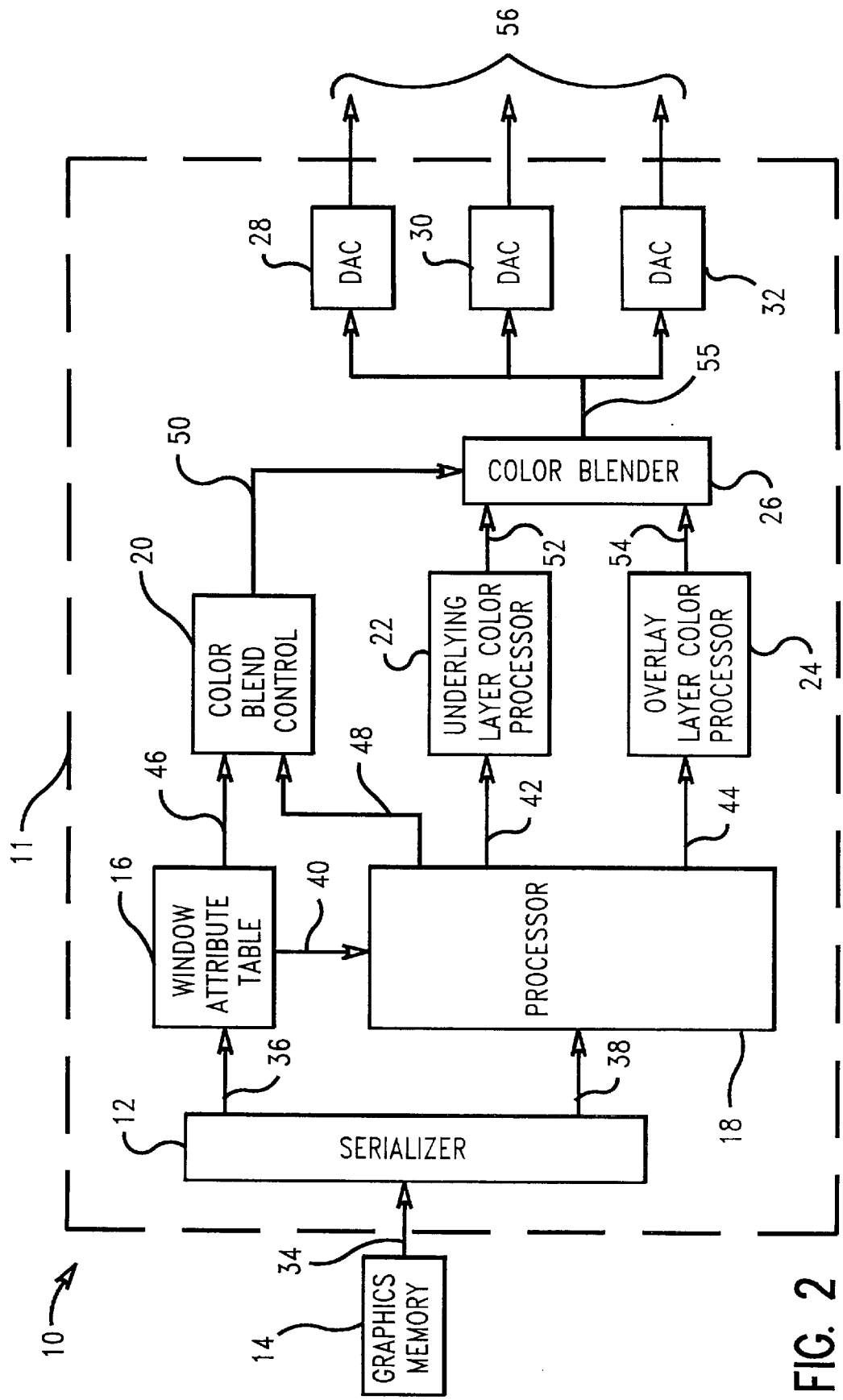
FIG. 2 is a block diagram of the graphics system of the present invention.

The system of the present invention provides the user with a clear and unobstructed view to overlay and underlying display layers. Thus, the user is able to distinguish the graphical data of the overlay and underlying display layers. FIG. 1 shows a computer graphics system which comprises a Graphics Controller 1, Graphics Memory 14, and a Palette DAC device 11. The computer graphics system is connected to the rest of the computer system over the System Bus 2. The graphics controller 1 provides the interface of the computer graphics system to the System Bus 2. Graphics controller 1 receives graphics data from System Bus 2 via bus 3. Graphics controller 1 is also connected to Graphics Memory 14 by bus 4. The Graphics Memory 14 is loaded with graphics data supplied by or via the Graphics Controller 1 and outputs that graphics data to Palette DAC 11 over bus 34. The Palette DAC 11 processes and converts that graphics data, outputting the processed and converted data 56 to a Display Device 58 for presentation as a visual image. Referring to FIG. 2, graphics system 10 of the present invention comprises serializer 12, memory or data storage device 14, window attribute table 16, processor 18, color-blend control 20, underlying layer color processor 22, overlay layer color processor 24, color-blender or processor 26 and digital-to-analog converters 28, 30 and 32.

Serializer 12 receives serial pixel data via data bus 34 from graphics memory 14. The serial data is several pixels wide at a predetermined fraction of the pixel frequency. Serializer 12 outputs pixel data preferably one (1) pixel wide at full pixel frequency. The pixel data outputted by the serializer 12 contains two (2) types of data: a Window Identifier (WID) which is outputted on bus 36, and the pixel data outputted on bus 38 for the underlying and overlay display layers. The WID functions as a pointer to locate window attributes in the Window Attribute Table (WAT) 16. WAT 16 may be realized by a storage or memory device. The attributes may be loaded into the WAT by software. The window or pixel attributes stored in the WAT 16 include, but are not limited to: (1) the format of the pixel data, (2) the presence and number of display layers associated with the pixel data, (3) the partitioning of the pixel data between the display layers, (4) the type of processing to be applied to the pixel data of each display layer, (5) blending control information which determines whether the colors of the display layers are to be blended or whether just one of the display layers is to be selected for display and the criteria upon which that selection would be based, and (6) weighting factors which define the proportion of the pixel colors of each display layer that are to be used in the blending process. The purpose and use of the color weighting factors will now be discussed in detail.

The weighting factors are assigned to the color of each pixel of each display layer. For example, an attribute assigned to a pixel of an underlying layer may define a weighting factor of 40%, and an attribute assigned to a pixel of an overlay layer may define a weighting factor of 60%. Thus, when the underlying layer and the overlay layer are displayed on a display device, the pixel locations associated with the interacting portions of the display layers will be represented by colors resulting from blending 40% of the color of the underlying layer with 60% of the color of the overlay layer. The blending function is achieved by the cooperation of color-blend control 20 with color-blender or processor 26. Blending the colors of the display layers according to the weighting factors assigned to the pixel effects a blended color value that maintains the information content of the graphical data of all the display layers. Therefore, the user is able to view the underlying and overlay display layers simultaneously. This process will be explained in detail below.

Processor 18 receives pixel data from the serializer 12 on data bus 38 and window or pixel attributes from the WAT 16 on data bus 40. Processor 18 separates and formats the pixel data of the display layers according to the supplied attributes. Processor 18 outputs the separated and formatted pixel data and pixel data processing control information for the underlying and overlay layers on data buses 42 and 44 respectively. Processor 18 performs any display layer selection using a pixel-based criterion if directed by the attributes supplied by the WAT 16 over data bus 40. Processor 18 outputs a select/blend control signal on bus 48 which is based on the color blending information contained in the attribute data received from the WAT 16 over data bus 40. The select/blend control signal is input into the color-blend control 20 and indicates (1) that the pixel colors of the display layers are to be blended according to the weighting factors stored in the WAT 16 and which are transmitted over data bus 46 to color-blend control 20, or (2) that the pixel colors are not to be blended and a specific display layer is to be directly selected, as a result of a selection made directly within the attributes or as a result of any pixel-based criterion required by those attributes. This will be discussed in detail below.

Data bus 42 receives the pixel data and pixel data processing control for the underlying layer and inputs this data into processor 22. Similarly, data bus 44 receives the pixel data and pixel data processing control for the overlay layer and inputs this data into processor 24. Processors 22 and 24 are color processors and assign original colors to each pixel of the underlying and overlay layers respectively. The processing performed by processors 22 and 24 is based on the pixel data processing control information received and includes the use of Color Look-Up Tables, Direct Color Bypass, Algorithmic Conversion, or Color Space Conversion. The color processed pixels are then output on buses 52 and 54.

Color-blend control 20 and color blender or processor 26 cooperate to blend the original colors assigned to the pixels of interacting display layers. WAT 16 outputs the weighting factors on data bus 46 for input into color-blend control 20. These weighting factors are used when the select/blend control signal (on bus 48) indicates that color blending is going to be effected. Color-blend control 20 receives the data on bus 46 and outputs a multi-bit signal on data bus 50. The multi-bit signal includes a control signal and the weighting factors and is inputted into color blender 26. Color blender 26 comprises addition and multiplication logic that performs arithmetic operations on the pixel data received via data buses 52 and 54. Color-blender 26 also includes a multiplexer circuit, the purpose of which will be described below.

If the control signal on data bus 50 indicates that the colors assigned to the pixel are to be blended, then color blender 26 will blend the colors assigned to the pixels according to the weighting factors as shown in the example above. If the control signal on bus 50 indicates that either the underlying layer or the overlay layer is to be directly selected, then the multiplexer circuit within color-blender 26 will select the pixel data from either the underlying layer or the overlay layer and route the selected pixel data directly to output data bus 55 so as to bypass all color-blending circuitry within color-blender 26.

Direct selection of one of the layers can also be implemented by assigning a weighting factor or blend proportion of 100% to one layer and 0% to the other layer. This can be accomplished by the software used to load the window or pixel attributes into WAT 16.

The signal on data bus 55 consists of a multi-bit signal that represents a color that will be displayed at a specific pixel location on a display screen. The signal on data bus 56 is then inputted into three (3) digital-to-analog converters 28, 30 and 32 which convert the multi-bit signal into three (3) analog signals representative of the primary colors red, green and blue, that drive three (3) corresponding primary color channels of the display screen.

In accordance with the present invention, the logic circuitry of color blender 26 is configured to assign a color value to a specific pixel location wherein the assigned color value is produced by blending the colors assigned to the pixels of the interacting underlying and overlay display layers according to the weighting factors stored in WAT 16. The color value assigned to the interacting pixel locations are blended in accordance with the following formula:

$$\text{Assigned Color Value} = \alpha A + (1-\alpha) B$$

where A and B are the digital values of the two (2) layers being blended, and where $\alpha$ and $(1-\alpha)$ are the weighting factors (blend proportions) obtained from the attributes stored in WAT 16. It is one preferred embodiment of the invention that a single weighting factor ($\alpha$) be stored in WAT 16. That single weighting factor would represent a proportion to be applied to one of the display layers in the blending process. The second weighting factor $(1-\alpha)$ would be developed as the difference between the first weighting factor and unity (100%), such that the sum of the two weighting factors is equal to unity (100%). It is another preferred embodiment of this invention that separate weighting factors (WF1 and WF2) are stored for each layer and that the weighting factors ($\alpha$ and $1-\alpha$) used by the color blender 26 are developed from the stored weighting factors as follows:

$$\alpha = WF1/(WF1+WF2);$$

and $$1-\alpha=WF2/(WF1+WF2)$$

Preferably, the equation for the Assigned Color Value shown above is implemented as a custom logic macro which provides 6-bit precision for the value of the weighting factors or blend proportions. The 6-bit precision permits the blending function to be controlled to 64 levels, thereby allowing a granularity of about 1.6% in the precision of the weighting factors stored in WAT 16.

The weighting factors stored in WAT 16 are defined in 6-bit fields and are supplied to the macro. The 6-bit value weighting factor is inputted into the macro on a per-pixel basis and effects blending of the colors assigned to the pixels of the overlay and underlying display layers according to the following equation:

$$\text{Assigned Color Value}=(A*X/64)+(B*(63-X)/64)$$

*denotes multiplication
where A and B are the digital values of the two (2) display layers, and where $0 \leq X \leq 63$ determines the weighting factor or blend proportion. From the equation above, it can be seen that full-scale (100%) of layer A is not achieved when X is $111111_{BIN}$, nor is full-scale (100%) of layer B achieved when X is $000000_{BIN}$. The macro contains circuitry to detect these two (2) end conditions of X and to directly select either A or B when X is $111111_{BIN}$ or $000000_{BIN}$, respectively.

The control signal outputted on bus 50 is based upon the select/blend control signal outputted by processor 18 on data bus 48. The control signal enables or disables the blending function of color blender 26 on a per-pixel basis. If the blending function of color blender 26 is disabled by the control signal, the macro effects a direct selection of the pixel data of either display layer A or display layer B.

The graphics system of the present invention enhances the displayed information to provide a blend of the overlay and underlying layers that extends over a full range, i.e. a completely transparent overlay layer to a completely opaque overlay layer. Thus, the present invention permits the imposition of an overlay layer onto an underlying layer without changing the color contrast of the overlay or underlying graphical data. Thus, the user is provided with an overlay layer through which the underlying graphical data of the underlying layer can be clearly seen. All operations are applied equally and separately to each primary color component of each pixel of the underlying and overlay layers.

As shown above, the extent of blending of pixel colors is controlled by the weighting factors loaded into WAT 16 by the software. The software can be formulated to meet specific requirements thereby providing the user with a new dimension of information context within a windowed environment.

Although graphics system 10 shown in FIG. 2 is configured for blending the colors of two (2) display layers, the graphics system may be configured to blend the colors of more than two (2) display layers. Such a configuration may include additional color-blender circuits in cascade with color blender 26.

For example, if it is required to blend three (3) display layers (A,B,C), two weighting factors ($\alpha$ and $\beta$) are stored in the WAT. The first weighting factor ($\alpha$) controls the blending of the first two display layers to generate an interim assigned color value, and the second weighting factor ($\beta$) controls the blending of the third layer with the interim assigned color value. This can be represented by the following equations:

$$\text{Interim Assigned Color Value (IACV)}=\alpha A+(1-\alpha)B$$

$$\text{Assigned Color Value}=\beta C+(1-\beta)\text{IACV}$$

Alternatively, three weighting factors (WF1, WF2, WF3) could be stored in the WAT for the three display layers (A,B,C respectively). Then, the $\alpha$, $(1-\alpha)$, $\beta$ and $(1-\beta)$ proportions in the above equations can be developed as follows:

$$\alpha=WF1(WF1+WF2)$$

and $$1-\alpha=WF2/(WF1+WF2)$$

$$\beta=WF3/(WF1+WF2+WF3)$$

and $$1\beta=(WF1+WF2)/(WF1+WF2+WF3)$$

The above blending of three (3) layers can be achieved by cascading two (2) color-blenders. The first color-blender would develop the Interim Assigned Color Value and then feed that result to one of the input ports of the second color blender where it is blended with the pixel data for the third layer. Alternatively, a more complex color-blender macro with three (3) input ports could be developed to execute the same function. It will be apparent to those skilled in the art that other similar techniques and variations may be equally applicable.

For the blending of more than three layers, techniques similar to the above may be implemented. It will be apparent to those skilled in the art that, as the number of display layers is increased, there are even more variations in the implementation of the increasingly complex blending function. For example, with four (4) display layers (A,B,C,D), the above techniques can be extended to three (3) weighting factors ($\alpha,\beta$, $\gamma$). Two Interim Assigned Color Values (IACV1,IACV2) could be developed and then further blended to generate the Assigned Color Value according to the following:

$$\text{Interim Assigned Color Value (IACV1)}=\alpha A+(1-\alpha)B$$

$$\text{Interim Assigned Color Value (IACV2)}=\beta C+(1-\beta)D$$

$$\text{Assigned Color Value}=\gamma\text{IACV1}+(1-\gamma)\text{IACV2}$$

Although the present invention has been described in terms of Workstation Graphics that utilize Window Identifier (WID) data, the present invention may be utilized in graphics environments that do not use WID data.

Although in the above description, the color blending information has been described as being part of the pixel data, the color-blending information may originate elsewhere. For example, the color-blending information may be a constant value stored in a register and applied as a constant to the display layers. Furthermore, the pixel data for the display layers could originate from completely separate and independent sources that do not provide any blending information e.g., a motion video source application and a spreadsheet graphics application. In such a scenario, another control means provides control over the actual display and provides only control information, e.g., blending information, but does not provide any pixel data. Additionally, the color-blending information may be (i) generated algorithmically, (ii) based on a function of the pixel data in any or more than one display layer, (iii) derived from other pixel-based criteria, or (iv) based on some image processing algorithm applied to one or more display layers.

The present invention may be applied to Palette DAC or similar devices that are used to process graphics data and then convert that processed data for display on CRT (cathode-ray tube), LCD (liquid crystal display) or other similar display devices. The present invention may also be applied to other elements of computer graphics systems. Furthermore, the present invention is not limited to window-based environments and may be used in other graphical applications such as CAD/CAE and Image Processing.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A graphics system, comprising:
   a format processor for receiving display data including pixel data and color-blending information, said format processor separating said pixel data for at least two (2) display layers, said pixel data including color information for said at least two (2) separate display layers, said color-blending information determining weighting factors and if the colors of said at least two (2) display layers are to be blended or if only a predetermined display layer is to be selected, said format processor outputting the separated pixel data for said at least two (2) display layers and said weighting factors;
   a color processor for each of said at least two (2) display layers, each color processor receiving pixel data from said format processor that corresponds to one of said at least two (2) display layers, each color processor assigning colors to said at least two (2) display layers according to the color information in the pixel data;
   a color-blender control responsive to said color blending information weighting factors, said color-blender control outputting a control signal indicating that the colors of said at least two (2) display layers are to be blended if the weighting factors are of a predetermined value or if a predetermined display layer is to be displayed if the weighting factors are outside said predetermined value; and
   a color blender for blending the colors assigned to the display layers according to said weighting factors, said color blender including a controller responsive to said control signal for either enabling said color blender to blend the colors of said at least two (2) display layers if the weighting factors are of said predetermined value or for selecting the predetermined display layer if said color blending information determines that only that particular display layer is to be displayed if the weighting factors are outside said predetermined value, and outputting either the blended colors or the predetermined display layer to a display device.

2. The graphics system according to claim 1 further including a storage device for storing the weighting factors, said weighting factors being applied to the colors of said at least two display layers.

3. The graphics system according to claim 2 further including a serializer for receiving serial display data having a first width and a first rate and converting the serial display data into serial display data having a second width and a second rate for input into said processor and said storage device.

4. The graphics system according to claim 1 further including means for converting the blended colors produced by said color blender into signals representative of the primary colors used in a display device.

5. The graphics system according to claim 1 wherein the blended colors produced by said color blender are the weighted average of the colors of said at least two (2) display layers.

6. A process for displaying graphic display layers, comprising the steps of:
   a) providing display data for at least two (2) display layers including pixel data and color-blending information, said pixel data including color information for said at least two (2) display layers, said color-blending information determining weighting factors for said at least two (2) display layers and if the colors of said at least two (2) display layers are to be blended or if only a predetermined display layer is to be selected;
   b) separating the pixel data into separate display layers;
   c) assigning colors to each of said at least (2) display layers according to the color information in the pixel data;
   d) determining from the color blending information weighting factors if the colors of said at least two (2) display layers are to be blended if the weighting factors are of a predetermined value or if a predetermined display layer is to be selected if the weighting factors are outside said predetermined value;
   e) blending the colors assigned to said at least two (2) display layers according to said weighting factors if it is determined in step (d) that the weighting factors are of said predetermined value indicating that the colors of said at least two (2) display layers are to be blended;
   f) selecting the predetermined display layer if it is determined in step (d) that the weighting factors are outside said predetermined value indicating that only that particular display layer is to be displayed; and
   g) outputting either the blended colors or the predetermined display layer to a display device.

7. The process according to claim 6 wherein the blended colors produced by said blending step (d) are the weighted average of the colors of said at least two (2) display layers, the weighted average being based on the weighting factors.

8. The process of claim 6 further including the step of displaying the blended colors representing said at least two (2) display layers.

9. The process of claim 6 further including the step of displaying the selected predetermined display layer.

10. A device for displaying interacting graphical information on a display device, comprising:
   a serializer for receiving serial display data for at least two (2) display layers, the received serial data having a first width and a first data rate, said serializer converting the received serial data into serial data having a second width and a second data rate;
   a format processor for receiving and separating the converted serial display data, said display data including pixel data and color-blending information, said pixel data including color information for said at least two (2) display layers, said color-blending information determining weighting factors and if the colors of said at least two (2) display layers are to be blended or if only a predetermined display layer is to be selected, said format processor outputting the separated pixel data for said at least two (2) display layers and said weighting factors;
   a storage device for storing said weighting factors;
   a color processor for each of said at least two (2) display layers, each color processor receiving pixel data from said format processor that corresponds to one of said at least two (2) display layers, each color processor assigning colors to one of said at least two (2) display layers according to the color information in the pixel data;

a color-blender control responsive to said color blending information weighting factors, said color-blender control outputting a control signal indicating that the colors of said at least two (2) display layers are to be blended if the weighting factors are of a predetermined value or if a predetermined display layer is to be displayed if the weighting factors are outside said predetermined value;

a color blender for blending the colors assigned to the display layers according to said weighting factors to produce a predetermined color that is the weighted average of the colors of said at least two (2) display layers, said color blender having a controller responsive to said control signal for either enabling said color blender to blend the colors of said at least two (2) display layers if the weighting factors are of said predetermined value or for selecting the predetermined display layer if said color blending information determines that only that particular display layer is to be displayed if the weighting factors are outside said predetermined value; and means for converting the predetermined color produced by said color blender into signals representing primary colors and outputting either the blended colors or the predetermined display layer to the display device.

* * * * *

UNITED STATES PATENT AND TRADEMARK OFFICE
CERTIFICATE OF CORRECTION

PATENT NO. : 5,874,967
DATED : February 23, 1999
INVENTOR(S) : West et al.

It is certified that error appears in the above-identified patent and that said Letters Patent is hereby corrected as shown below:

Column 8, line 16:
  After "and" delete "1β" and substitute therefor --1-β--

Signed and Sealed this

First Day of June, 1999

Attest:

Q. TODD DICKINSON

*Attesting Officer*   Acting Commissioner of Patents and Trademarks